US012780001B2

(12) United States Patent
Kato

(10) Patent No.: US 12,780,001 B2
(45) Date of Patent: Nov. 3, 2026

(54) DISPLAY APPARATUS FOR VEHICLE

(71) Applicant: SUBARU CORPORATION, Tokyo (JP)

(72) Inventor: Hideaki Kato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 9 days.

(21) Appl. No.: 18/976,797

(22) Filed: Dec. 11, 2024

(65) Prior Publication Data

US 2025/0282224 A1 Sep. 11, 2025

(30) Foreign Application Priority Data

Mar. 5, 2024 (JP) ................................ 2024-033430

(51) Int. Cl.

*B60K 35/81* (2024.01)
*B60K 35/22* (2024.01)
*B60K 35/28* (2024.01)

(52) U.S. Cl.

CPC .............. *B60K 35/81* (2024.01); *B60K 35/22* (2024.01); *B60K 35/28* (2024.01); *B60K 2360/119* (2024.01); *B60K 2360/1468* (2024.01); *B60K 2360/48* (2024.01); *B60K 2360/595* (2024.01)

(58) Field of Classification Search

CPC ........ B60K 34/81; B60K 35/28; B60K 35/22; B60K 2360/1468; B60K 2360/595; B60K 2360/119; B60K 2360/48

USPC .......................................................... 340/461

See application file for complete search history.

(56) References Cited

U.S. PATENT DOCUMENTS

| | | | | |
|---|---|---|---|---|
| 9,798,443 | B1 * | 10/2017 | Gray | G06F 3/0488 |
| 2011/0164053 | A1 * | 7/2011 | Nakamura | G01C 21/3664<br>345/629 |
| 2020/0233567 | A1 * | 7/2020 | Boyagian | B60K 35/10 |

FOREIGN PATENT DOCUMENTS

| | | |
|---|---|---|
| JP | 2010-067129 A | 3/2010 |

* cited by examiner

*Primary Examiner* — Kam Wan Ma

(74) *Attorney, Agent, or Firm* — Rimon P.C.

(57) ABSTRACT

A vehicle display apparatus includes: a display including a first region in which provided content is to be displayed and a second region in which a link icon linking to the content is to be displayed; a touch sensor; a display control unit controlling a display mode of the display; and a storage holding data on the display mode. The display control unit keeps a display area of the second region smaller than that of the first region, and expands, when the touch sensor detects a swiping operation made by an occupant in the vehicle on the link icon, a rendering region of the second region, based on a completion position of the swiping operation, within a range where the display area of the second region is kept smaller than that of the first region, while continuing to execute display control in the first region.

6 Claims, 11 Drawing Sheets

DISPLAY APPARATUS FOR VEHICLE

CROSS-REFERENCE TO RELATED APPLICATIONS

The present application claims priority from Japanese Patent Application No. 2024-033430 filed on Mar. 5, 2024, the entire contents of which are hereby incorporated by reference.

BACKGROUND

The disclosure relates to a display apparatus for a vehicle.

A vehicle display apparatus has been widely known that displays various kinds of information including route guidance on a route from a current position of an own vehicle or a current location to a destination, based on both of map data and current position data on the own vehicle received from a positioning satellite system.

Such a vehicle display apparatus includes, for example, a display having a first region serving as, for example, a main palette, and a second region serving as, for example, a sub-palette.

For example, a main screen is to be displayed in the first region or main palette, and a shortcut icon to each functionality is to be displayed in the second region or sub-palette.

When an occupant in the own vehicle selects an icon displayed on the second region or sub-palette, the functionality corresponding to the icon is rendered in the first region or main palette.

One of the vehicle display apparatuses of this type is disclosed in, for example, Japanese Patent Unexamined Patent Application Publication (JP-A) No. 2010-067129. The vehicle display apparatus includes an image processor, a user's operation detector, and a superimposed image generator. The image processor causes a basic screen including a button image to be displayed on a touch panel. The user's operation detector detects a user's operation made on the button image. When the user's operation is detected, the superimposed image generator generates a pop-up image superimposed on the basic screen to provide a predetermined functionality assigned to the button image. The image processor causes the pop-up image superimposed on the basic screen to be displayed on the touch panel. The pop-up image includes a relation display image that allows a user to visually understand a relation between the button image and the pop-up image. The relation display image is continuously displayed even when display content of the pop-up image is updated.

SUMMARY

An aspect of the disclosure provides a display apparatus for a vehicle. The display apparatus includes a display, a touch sensor, a display control unit, and a storage. The display includes a first region in which provided content is to be displayed and a second region in which a link icon linking to the content is to be displayed. The display control unit is configured to execute display control that controls a display mode of the display. The storage is configured to store information including data on the display mode of the display. The display control unit is configured to execute the display control to cause a display area of the second region to become smaller than a display area of the first region, and execute, when the touch sensor detects a swiping operation made by an occupant in the vehicle on the link icon displayed on the display, the display control to make expansion of a rendering region of the second region, based on a completion position of the swiping operation made by the occupant, to or below an upper limit of a range where the display area of the second region is kept smaller than the display area of the first region, while continuing to execute the display control in the first region.

An aspect of the disclosure provides a display apparatus for a vehicle. The display apparatus includes a display, a touch sensor, one or more processors, and one or or memories. The display includes a first region in which provided content is to be displayed and a second region in which a link icon linking to the content is to be displayed. The one or more processors are configured to execute display control that controls a display mode of the display. The one or more memories are communicably coupled to the one or more processors and configured to store information including data on the display mode of the display. The one or more processors are configured to execute the display control to cause a display area of the second region to become smaller than a display area of the first region, and execute, when the touch sensor detects a swiping operation made by an occupant in the vehicle on the link icon displayed on the display, the display control to make expansion of a rendering region of the second region, based on a completion position of the swiping operation made by the occupant, to or below an upper limit of a range where the display area of the second region is kept smaller than the display area of the first region, while continuing to execute the display control in the first region.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to explain the principles of the disclosure.

DETAILED DESCRIPTION

Figure 1:
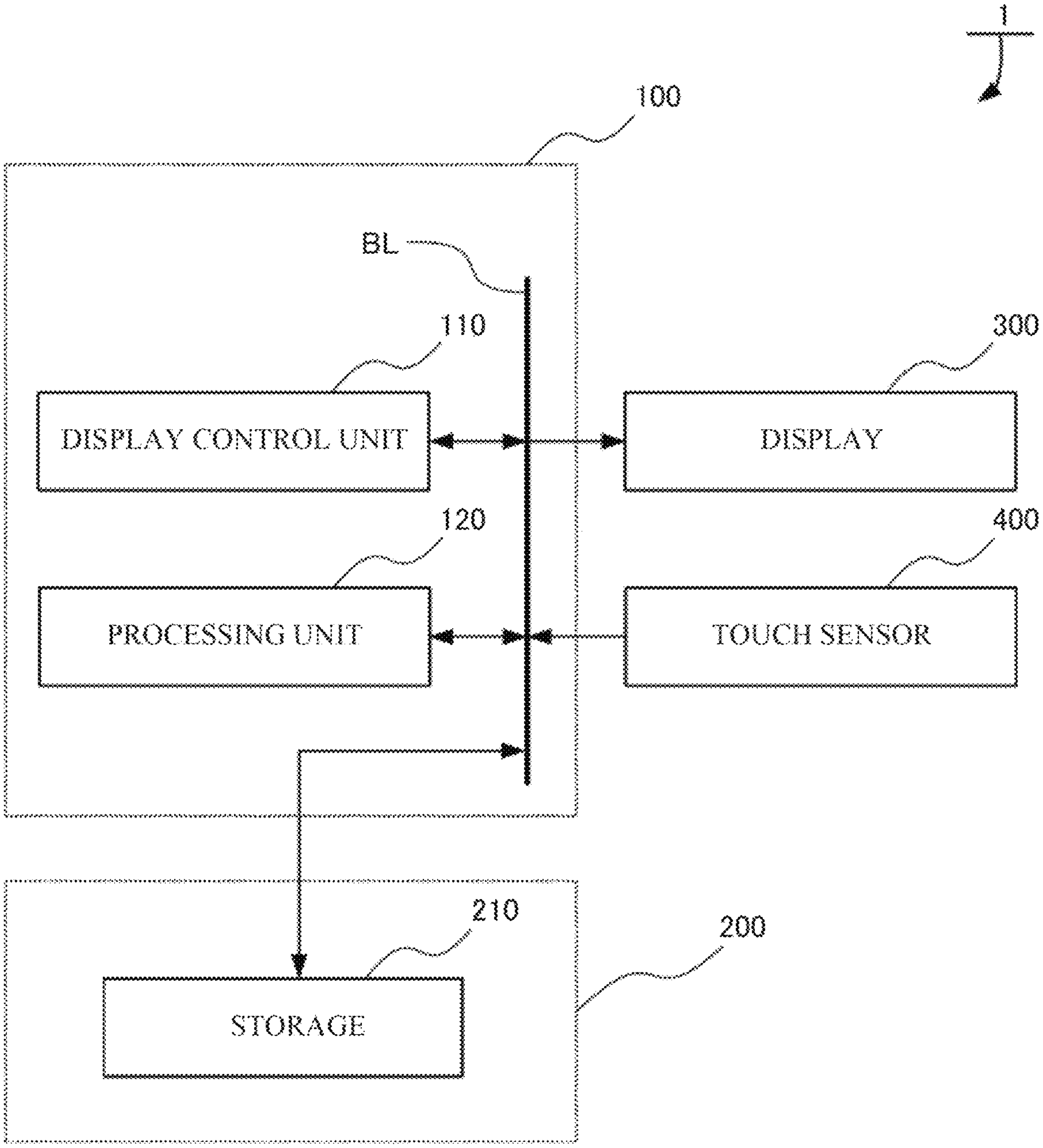
FIG. 1 is a block diagram illustrating a configuration example of a vehicle display apparatus according to one example embodiment of the disclosure.

According to a vehicle display apparatus disclosed in JP-A No. 2010-067129, rendering of a functionality in a first region or main palette can be interrupted or suspended when a passenger in a vehicle or a driver who drives the vehicle selects an icon displayed in a second region or sub-palette. Moreover, it is difficult for the passenger or driver to accurately recognize the content of the functionality, simply based on the icon displayed in the second region or sub-palette.

It is desirable to provide a display apparatus for a vehicle that makes it possible to provide appropriate information displaying to a driver who drives the vehicle by expanding a rendering region of a second region or sub-palette as needed, while securing normal displaying in a first region or main palette.

In the following, some example embodiments of a vehicle display apparatus according to the disclosure are described in detail with reference to FIGS. 1 to 11. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

First Example Embodiment

A vehicle display apparatus 1 according to a first example embodiment of the disclosure will now be described with reference to FIGS. 1 to 4.

Configuration Example of Vehicle Display Apparatus 1

Referring to FIG. 1, the vehicle display apparatus 1 according to the first example embodiment includes a processor 100, a memory 200, a display 300, and a touch sensor 400.

The processor 100 may execute various kinds of processing that control a display mode of the display 300, which will be described later, in response to a touch operation made by an occupant of the vehicle (hereinafter simply referred to as "occupant") on the touch sensor 400, which will be described later.

In the present example embodiment, the display 300 includes a first region (e.g., main palette) in which provided content is to be displayed, and a second region (e.g., sub-palette) in which link icons linking to the respective pieces of content are to be displayed. The processor 100 executes display control that causes a display area of the second region to become smaller than a display area of the first region. When the touch sensor 400 detects a swiping operation made by the occupant on any of the link icons displayed on the display 300, the processor 100 executes display control that expands a rendering region of the second region, based on a completion position of the swiping operation, to or below an upper limit of a range where the display area of the second region is kept smaller than the display area of the first region, while continuing to execute the display control in the first region.

According to the present example embodiment, the processor 100 may further execute display control that causes additional information supplementing the information provided by the link icons to be displayed, in accordance with the expansion of the rendering region, for example.

Each of the processes will be described in detail later.

The memory 200 may include a read only memory (ROM) or a random access memory (RAM), and hold and store various programs and various kinds of data.

The memory 200 may include a storage 210. The storage 210 may hold and store, for example, the upper limit of expansion of the display area of the second region and display image information on the additional information supplementing the information provided by the link icons.

The display 300 may display information including image information, illustration information, and text information.

In some embodiments, the display 300 may be a liquid crystal display.

The touch sensor 400 may detect contact between the occupant and the display 300.

In some embodiments where the display 300 is a liquid crystal display, the touch sensor 400 may be disposed below the display 300.

The touch sensor 400 may be any kind of sensing device, such as a resistive touch sensor, a static capacity sensor, an ultrasonic sensor, or an optical (infrared light) sensor.

Configuration Example of Processor 100

Referring to FIG. 1, the processor 100 of the vehicle display apparatus 1 according to the present example embodiment may include a display control unit 110 and a processing unit 120.

As illustrated in FIG. 1, devices in the vehicle display apparatus 1 such as the display control unit 110, the processing unit 120, the memory 200, the display 300, and the touch sensor 400 may be coupled to each other via a bus line BL.

The display control unit 110 may control a display mode of the display 300.

In the present example embodiment, the display 300 includes the first region (e.g., main palette) in which the provided content is to be displayed, and the second region (e.g., sub-palette) in which the link icons linking to the respective pieces of content are to be displayed. The display control unit 110 executes the display control that causes the display area of the second region to become smaller than the display area of the first region. When the touch sensor 400 detects a swiping operation made by the occupant on any of the link icons displayed on the display 300, the display control unit 110 executes the display control that expands the rendering region of the second region, based on the completion position of the swiping operation, to or below the upper limit of the range where the display area of the second region is kept smaller than the display area of the first region, while continuing to execute the display control in the first region.

Figure 2:
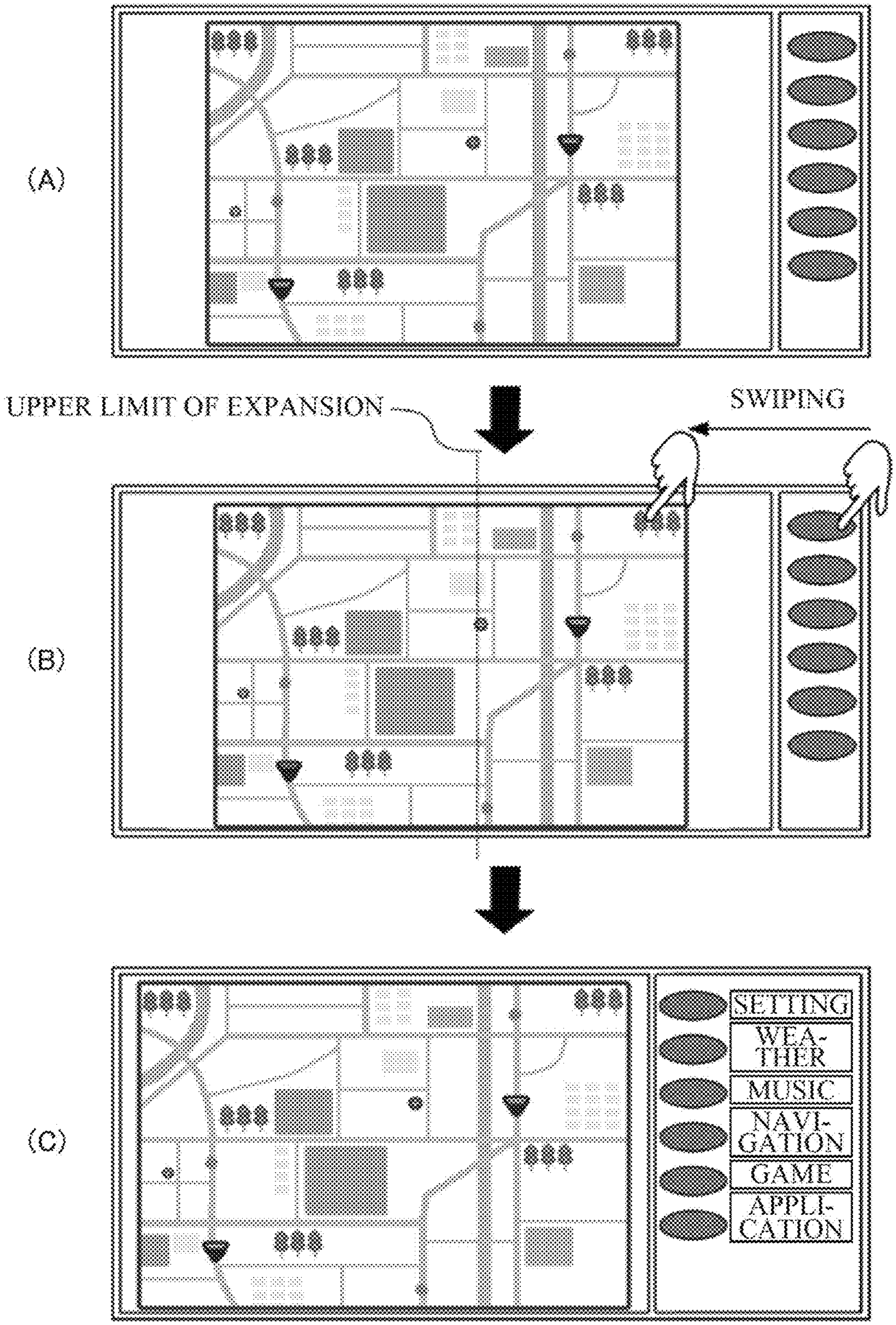
FIG. 2 is a diagram illustrating exemplary display modes in first and second regions of a display of the vehicle display apparatus illustrated in FIG. 1.

In an example illustrated in FIG. 2, the occupant may make a swiping operation on any of the link icons displayed on the display 300 illustrated in Part (A) of FIG. 2, as indicated by an arrow in Part (B) of FIG. 2. When such a swiping operation is detected, the display control unit 110 may execute the display control that expands the rendering region of the second region, based on a completion position of the swiping operation made by the occupant, while continuing to execute the display control in the first region, as illustrated in Part (C) of FIG. 2.

Figure 3:
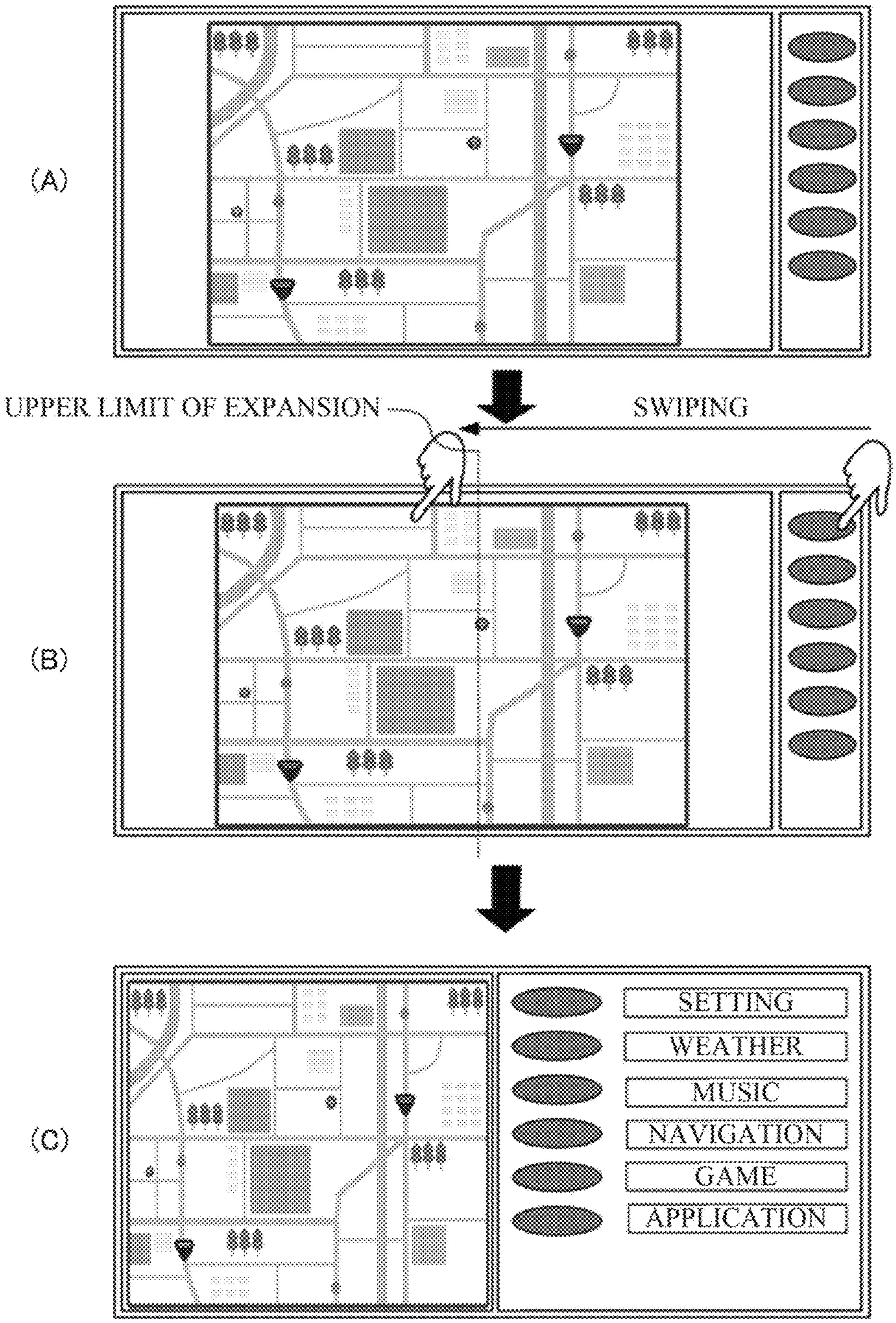
FIG. 3 is a diagram illustrating exemplary display modes in the first and second regions of the display of the vehicle display apparatus illustrated in FIG. 1.

In an example illustrated in FIG. 3, the occupant may make a swiping operation on any of the link icons displayed on the display 300 illustrated in Part (A) of FIG. 3, as indicated by an arrow in Part (B) of FIG. 3. When such a swiping operation is detected, the display control unit 110 may execute the display control that expands the rendering region of the second region, based on a completion position of the swiping operation made by the occupant, to or below the upper limit of the range where the display area of the second region is kept smaller than the display area of the first region, while continuing to execute the display control in the first region, as illustrated in Part (C) of FIG. 3.

As illustrated in Part (C) of FIG. 2 and Part (C) of FIG. 3, for example, the display control unit 110 may execute control that causes the additional information supplementing the information provided by the link icons to be displayed, in accordance with the expansion of the rendering region. Non-limiting examples of the additional information may include “setting”, “weather”, “music”, “navigation”, “game” and “application”.

The control by the display control unit 110 may be executed based on sensor output data transmitted from the touch sensor 400 to the processing unit 120, which will be described later, via the bus line BL.

The processing unit 120 may control an overall operation of the vehicle display apparatus 1, based on a control program stored in the ROM in the storage 210, for example.

In some embodiments, the processing unit 120 may cause the touch sensor 400 to transmit the sensor output data and cause the display control unit 110 to execute the display control.

In some embodiments, the processing unit 120 may transmit the sensor output data received from the touch sensor 400 to the display control unit 110 via the bus line BL, thereby causing the display control unit 110 to execute the display control.

<Exemplary Processing by Vehicle Display Apparatus 1>

Figure 4:
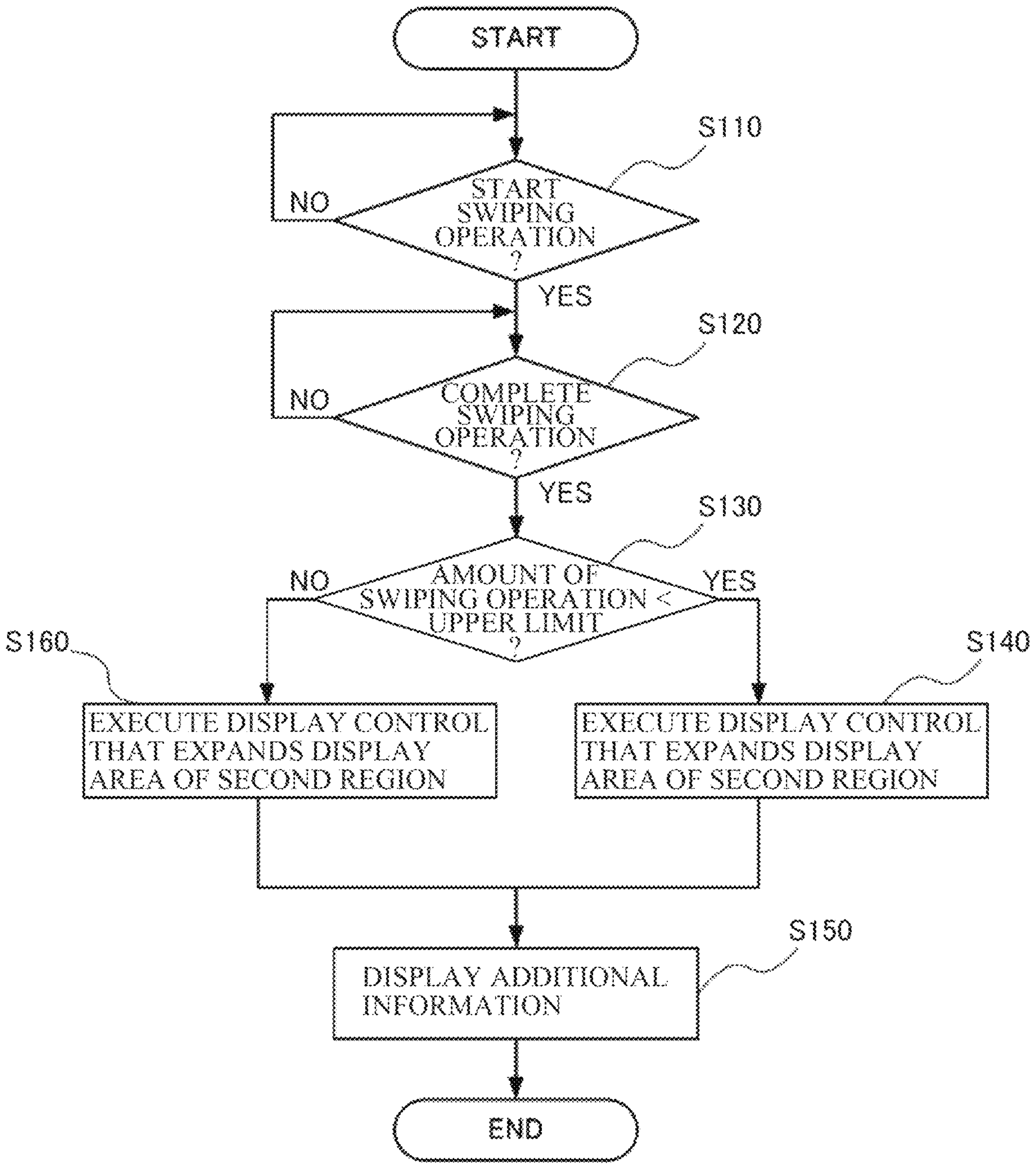
FIG. 4 is a flowchart of exemplary processing to be performed by the vehicle display apparatus illustrated in FIG. 1.

Exemplary processing to be performed by the vehicle display apparatus 1 according to the present example embodiment will now be described with reference to FIG. 4.

In Step S110, the processing unit 120 may determine whether the occupant has started making the swiping operation, based on the sensor output data received from the touch sensor 400.

If determining, based on the sensor output data received from the touch sensor 400, that the occupant has not started making the swiping operation (Step S110: NO), the processing unit 120 may cause the processing to shift to a stand-by mode.

If determining, based on the sensor output data received from the touch sensor 400, that the occupant has started making the swiping operation (Step S110: YES), the processing unit 120 may cause the processing to proceed to Step S120.

In Step S120, the processing unit 120 may determine whether the occupant has completed the swiping operation, based on the sensor output data received from the touch sensor 400 (Step S120).

If determining, based on the sensor output data received from the touch sensor 400, that the occupant has not completed the swiping operation (Step S120: NO), the processing unit 120 may cause the processing to shift to the stand-by mode.

If determining, based on the sensor output data received from the touch sensor 400, that the occupant has completed the swiping operation (Step S120: YES), the processing unit 120 may cause the processing to proceed to Step S130.

In Step S130, the processing unit 120 may determine whether the amount of swiping operation made by the occupant is less than a predetermined upper limit, based on the sensor output data received from the touch sensor 400.

If determining, based on the sensor output data received from the touch sensor 400, that the amount of swiping operation made by the occupant is less than the predetermined upper limit (Step S130: YES), the processing unit 120 may execute, in Step S140, the display control that expands the rendering region of the second region, based on the amount of swiping operation made by the occupant, while continuing to execute the display control in the first region.

Even after the expansion of the rendering region, the processing unit 120 may continue to execute the display control in the first region, and execute, in Step S150, the control that causes the additional information supplementing the information provided by the link icons to be displayed in the second region, in accordance with the expansion of the rendering region. Thereafter, the processing may end.

If determining, based on the sensor output data received from the touch sensor 400, that the amount of swiping operation made by the occupant is not less than the predetermined upper limit (Step S130: NO), the processing unit 120 may execute, in Step S160, the display control that expands the rendering region of the second region, based on the predetermined upper limit, while continuing to execute the display control in the first region. Note that the predetermined upper limit may be set to such a value that the display area of the second region is smaller than the display area of the first region.

Even after the expansion of the rendering region, the processing unit 120 may continue to execute the display control in the first region, and execute, in Step S150, the display control that causes the additional information supplementing the information provided by the link icons to be displayed in the second region, in accordance with the expansion of the rendering region. Thereafter, the processing may end.

<Workings and Effects>

As described above, the vehicle display apparatus 1 according to the present example embodiment includes the display 300, the touch sensor 400, the display control unit 110, and the storage 210. The display 300 may display the information including the image information and the text information. The touch sensor 400 may detect contact between the occupant and the display 300. The display control unit 110 controls the display mode of the display 300. The storage 210 holds the information including the information on the display mode of the display 300. The display 300 includes the first region in which the provided content is to be displayed, and the second region in which the link icons linking to the respective pieces of content are to be displayed. The display control unit 110 executes the display control that causes the display area of the second region to become smaller than the display area of the first region. When the touch sensor 400 detects the swiping operation made by the occupant on any of the link icons displayed on the display 300, the display control unit 110 executes the display control that expands the rendering region of the second region, based on the completion position of the swiping operation, to or below the upper limit of the range where the display area of the second region is kept smaller than the display area of the first region, while continuing to execute the display control in the first region.

That is, the display control unit 110 executes the display control that causes the display area of the second region to become smaller than the display area of the first region, and executes, when the touch sensor 400 detects the swiping operation made by the occupant on any of the link icons displayed on the display 300, the display control that expands the rendering region of the second region, based on the completion position of the swiping operation, to or below the upper limit of the range where the display area of the second region is kept smaller than the display area of the first region, while continuing to execute the display control in the first region.

It is therefore possible to provide appropriate information displaying to the driver who drives the vehicle by expanding the rendering region of the second region (e.g., sub-palette) as needed, while securing normal displaying in the first region (e.g., main palette).

According to a typical technique of changing the size of a display region to a desired size, the size of the display region is changed upon detection of a swiping operation starting from an edge of the display region, based on a completion position of the swiping operation. However, it is difficult for the driver who is driving the vehicle to make such a swiping operation on an edge of the rendering region of the second region (e.g., sub-palette) because the display area of the edge is narrow. In contrast, according to the present example embodiment, the display control unit 110 in the vehicle display apparatus 1 expands the rendering region of the second region upon detection of a swiping operation made by occupant on the link icon on the display 300, based on the completion position of the swiping operation. This allows the driver who is driving the vehicle to easily change the display size.

The display control unit 110 in the vehicle display apparatus 1 according to the present example embodiment may cause the additional information supplementing the information provided by the link icons to be displayed, in accordance with the expansion of the rendering region.

In some embodiments, the display control unit 110 may cause the additional information, such as "setting", "weather", "music", "navigation", "game", and "application", supplementing the information provided by the link icons to be displayed in the second region.

It is therefore possible to provide appropriate information displaying to the driver who drives the vehicle by expanding the rendering region of the second region (e.g., sub-palette) as needed, while securing normal displaying in the first region (e.g., main palette).

Second Example Embodiment

A vehicle display apparatus 1A according to a second example embodiment of the disclosure will now be described with reference to FIGS. 5 to 7.

Configuration Example of Vehicle Display Apparatus 1A

Figure 5:
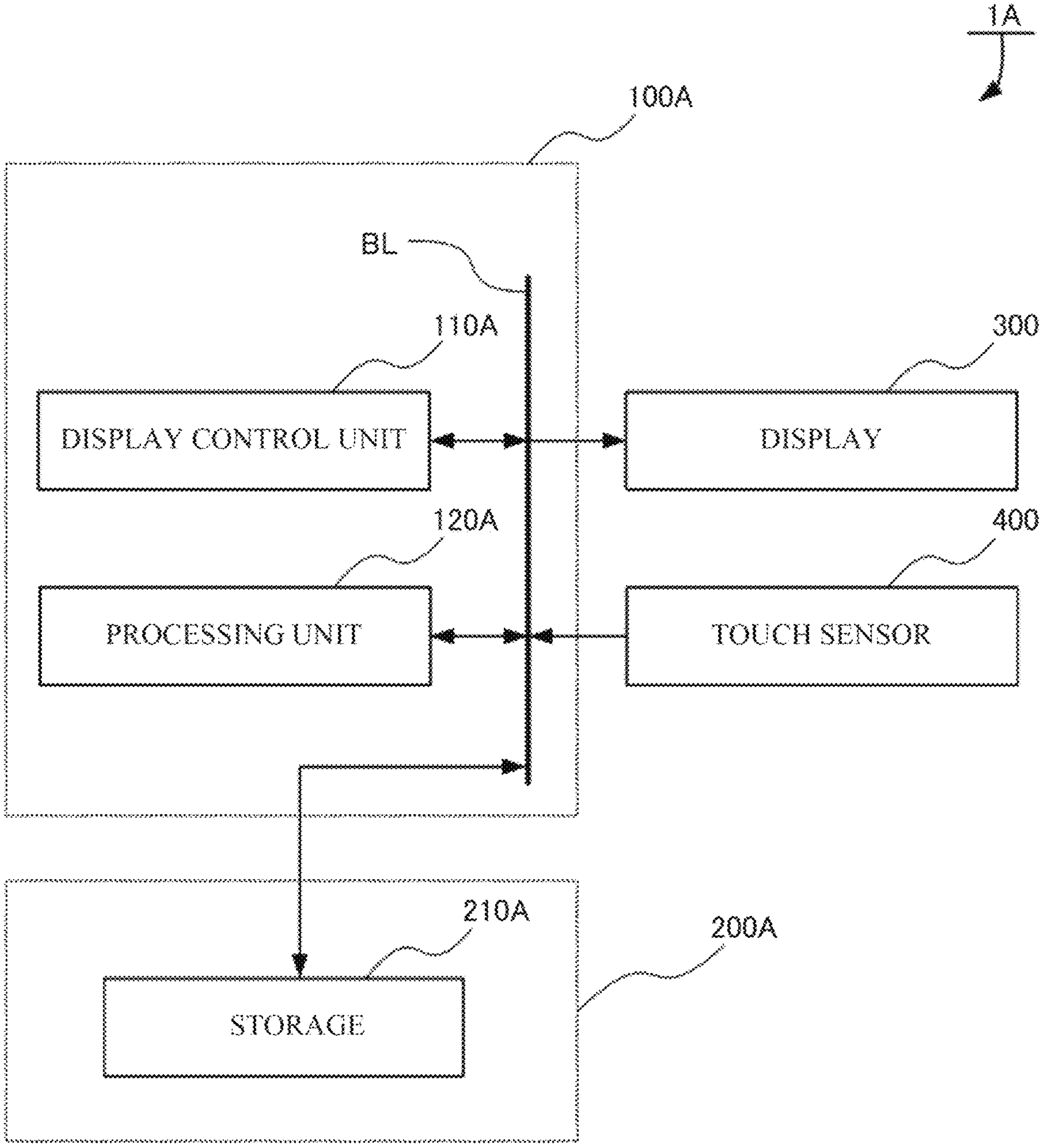
FIG. 5 is a block diagram illustrating a configuration example of a vehicle display apparatus according to one example embodiment of the disclosure.

Referring to FIG. 5, the vehicle display apparatus 1A according to the second example embodiment includes a processor 100A, a memory 200A, a display 300, and a touch sensor 400.

Note that components having the same functionalities as those in the first example embodiment are denoted by the same reference numerals to omit detailed description thereof.

The processor 100A may execute various kinds of processing that control a display mode of the display 300, which will be described later, in response to a touch operation made by the occupant of the vehicle on the touch sensor 400, which will be described later.

In the present example embodiment, the display 300 includes a first region (e.g., main palette) in which provided content is to be displayed, and a second region (e.g., sub-palette) in which link icons linking to the respective pieces of content are to be displayed. The processor 100A executes display control that causes a display area of the second region to become smaller than a display area of the first region. When the touch sensor 400 detects a swiping operation made by the occupant on any of the link icons displayed on the display 300, the processor 100A executes the display control that expands a rendering region of the second region, based on a completion position of the swiping operation, to or below an upper limit of a range where the display area of the second region is kept smaller than the display area of the first region, while continuing to execute the display control in the first region.

According to the present example embodiment, the processor 100A may further execute display control that enlarges the display sizes of the link icons or additional information, in accordance with the expansion of the rendering region, for example.

Each of the processes will be described in detail later.

The memory 200A may include a read only memory (ROM) or a random access memory (RAM), and hold and store various programs and various kinds of data.

The memory 200A may include a storage 210A. The storage 210A may hold and store, for example, the upper limit of expansion of the display area of the second region, display image information on the additional information supplementing the information provided by the link icons, and display size information on the display sizes of the link icons or additional information.

Configuration Example of Processor 100A

Referring to FIG. 5, the processor 100A of the vehicle display apparatus 1A according to the present example embodiment may include a display control unit 110A and a processing unit 120 A.

As illustrated in FIG. 5, devices in the vehicle display apparatus 1A such as the display control unit 110A, the processing unit 120A, the memory 200A, the display 300, and the touch sensor 400 may be coupled to each other via a bus line BL.

The display control unit 110A may control a display mode of the display 300.

In the present example embodiment, the display 300 includes the first region (e.g., main palette) in which the provided content is to be displayed, and the second region (e.g., the sub-palette) in which the link icons linking to the respective pieces of content are to be displayed. The display control unit 110A executes the display control that causes the display area of the second region to become smaller than the display area of the first region. When the touch sensor 400 detects a swiping operation made by the occupant on any of the link icons displayed on the display 300, the display control unit 110A executes the display control that expands the rendering region of the second region, based on the completion position of the swiping operation, to or below the upper limit of the range where the display area of the second region in kept smaller than the display area of the first region, while continuing to execute the display control in the first region.

In the example illustrated in FIG. 2, the occupant may make a swiping operation on any of the link icons displayed on the display 300 illustrated in Part (A) of FIG. 2, as indicated by the arrow in Part (B) of FIG. 2. When such a swiping operation is detected, the display control unit 110A may execute the display control that expands the rendering region of the second region, based on a completion position of the swiping operation made by the occupant, while continuing to execute the display control in the first region, as illustrated in Part (C) of FIG. 2.

In the example illustrated in FIG. 3, the occupant may make a swiping operation on any of the link icons on the display 300 illustrated in Part (A) of FIG. 3, as indicated by the arrow in Part (B) of FIG. 3. When such a swiping operation is detected, the display control unit 110A may execute the display control that expands the rendering region of the second region, based on a completion position of the swiping operation, to or below the upper limit of the range where the display area of the second region is kept smaller than the display area of the first region, while continuing to execute the display control in the first region, as illustrated in Part (C) of FIG. 3.

Figure 6:
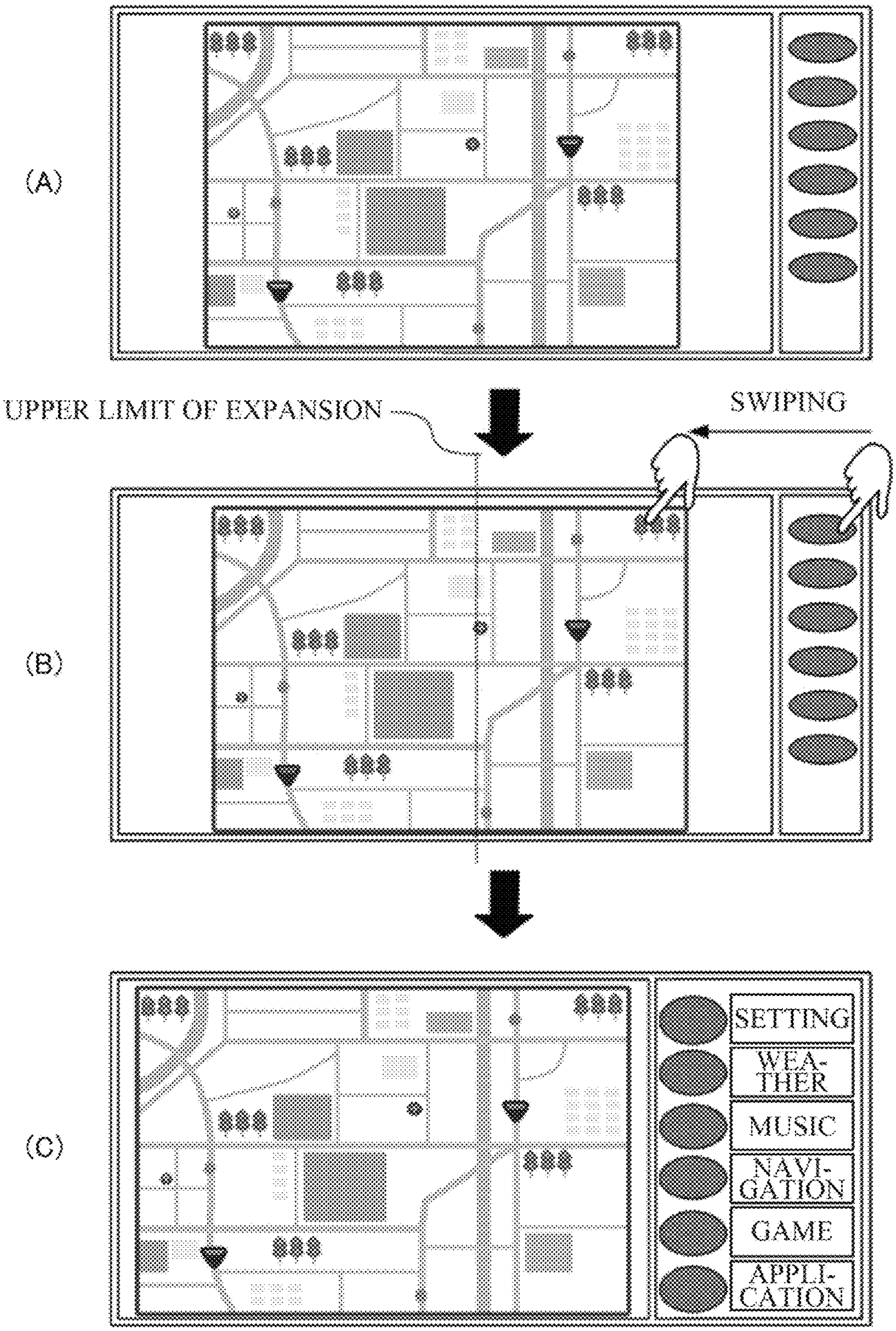
FIG. 6 is a diagram illustrating exemplary display modes in first and second regions of a display of the vehicle display apparatus illustrated in FIG. 5.
Figure 7:
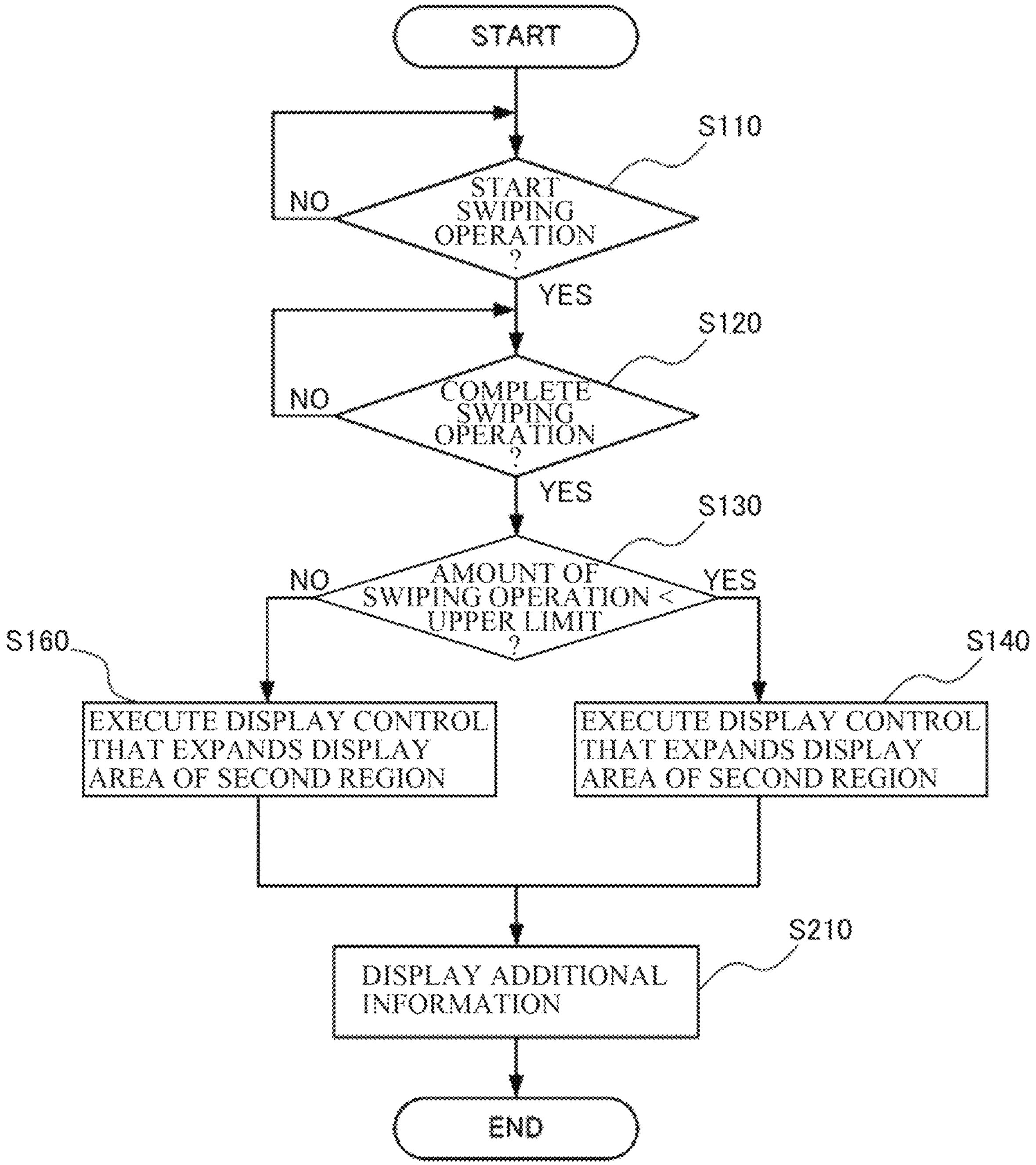
FIG. 7 is a flowchart of exemplary processing to be performed by the vehicle display apparatus illustrated in FIG. 5.

The display control unit 110A may further execute the display control that enlarges the display sizes of the link icons or additional information in accordance with the expansion of the rendering region, as illustrated in Part (A) to (C) of FIG. 6, for example.

The control by the display control unit 110A may be executed based on sensor output data transmitted from the touch sensor 400 to the processing unit 120A, which will be described later, via the bus line BL.

The processing unit 120A may control an overall operation of the vehicle display apparatus 1A, based on a control program stored in the ROM in the storage 210A, for example.

In some embodiments, the processing unit 120A may cause the touch sensor 400 to transmit the sensor output data and cause the display control unit 110A to execute the display control.

In some embodiments, the processing unit 120A may transmit the sensor output data received from the touch sensor 400 to the display control unit 110A via the bus line BL, thereby causing the display control unit 110A to execute the display control that enlarges the display sizes of the link icons or additional information in accordance with the expansion of the rendering region.

<Exemplary Processing by Vehicle Display Apparatus 1A>

Exemplary processing to be performed by the vehicle display apparatus 1A according to the present example embodiment will now be described with reference to FIG. 7.

In Step S110, the processing unit 120A may determine whether the occupant has started making the swiping operation, based on the sensor output data received from the touch sensor 400.

If determining, based on the sensor output data received from the touch sensor 400, that the occupant has not started making the swiping operation (Step S110: NO), the processing unit 120A may cause the processing to shift to a stand-by mode.

If determining, based on the sensor output data received from the touch sensor 400, that the occupant has started making the swiping operation (Step S110: YES), the processing unit 120A may cause the processing to proceed to Step S120.

In Step S120, the processing unit 120A may determine whether the occupant has completed the swiping operation, based on the sensor output data received from the touch sensor 400 (Step S120).

If determining, based on the sensor output data received from the touch sensor 400, that the occupant has not completed the swiping operation (Step S120: NO), the processing unit 120A may cause the processing to shift to the stand-by mode.

If determining, based on the sensor output data received from the touch sensor 400, that the occupant has completed the swiping operation (Step S120: YES), the processing unit 120A may cause the processing to proceed to Step S130.

In Step S130, the processing unit 120A may determine whether the amount of swiping operation made by the occupant is less than a predetermined upper limit, based on the sensor output data received from the touch sensor 400.

If determining, based on the sensor output data received from the touch sensor 400, that the amount of swiping operation made by the occupant is less than the predetermined upper limit (Step S130: YES), the processing unit 120A may execute, in Step S140, the display control that expands the rendering region of the second region, based on the amount of swiping operation made by the occupant, while continuing to execute the display control in the first region.

Even after the expansion of the rendering region, the processing unit 120A may continue to execute the display control in the first region, and execute, in Step S210, the display control that causes the additional information supplementing the information provided by the link icon to be displayed and that enlarges the display sizes of the link icons or additional information, in accordance with the expansion of the rendering region. Thereafter, the processing may end.

If determining, based on the sensor output data received from the touch sensor 400, that the amount of swiping operation made by the occupant is not less than the predetermined upper limit (Step S130: NO), the processing unit 120A may execute, in Step S160, the display control that expands the rendering region of the second region, based on the predetermined upper limit, while continuing to execute the display control in the first region. Note that the predetermined upper limit may be set to such a value that the display area of the second region is kept smaller than the display area of the first region.

Even after the expansion of the rendering region, the processing unit 120A may continue to execute the display control in the first region, and execute, in Step S210, the display control that causes the additional information supplementing the information provided by the link icons to be displayed and that enlarges the display sizes of the link icons or additional information, in accordance with the expansion of the rendering region. Thereafter, the processing may end.

<Workings and Effects>

As described above, the vehicle display apparatus 1A according to the present example embodiment includes the display 300, the touch sensor 400, the display control unit 110A, and the storage 210A. The display 300 may display the information including the image information and the text information. The touch sensor 400 may detect contact between the occupant and the display 300. The display control unit 110A controls the display mode of the display 300. The storage 210 holds the information including the information on the display mode of the display 300. The display 300 includes the first region in which the provided content is to be displayed, and the second region in which the link icons linking to the respective pieces of content are to be displayed. The display control unit 110A executes the display control that causes the display area of the second region to become smaller than the display area of the first region. When the touch sensor 400 detects the swiping operation made by the occupant on any of the link icons displayed on the display 300, the display control unit 110A executes the display control that expands the rendering region of the second region, based on the completion position of the swiping operation, to or below the upper limit of the range where the display area of the second region is kept smaller than the display area of the first region, while continuing to execute the display control in the first region. Further, the display control unit 110A may execute the display control that causes the additional information supplementing the information provided by the link icon to be displayed and that enlarges the display sizes of the link icons or additional information, in accordance with the expansion of the rendering region.

That is, the display control unit 110A executes the display control that causes the display area of the second region to become smaller than the display area of the first region. When the touch sensor 400 detects the swiping operation made by the occupant on the link icon displayed on the display 300, the display control unit 110A executes the display control that expands the rendering region of the second region, to or below the upper limit of the range where the display area of the second region is kept smaller than the display area of the first region, based on the completion position of the swiping operation, while continuing to execute the display control in the first region. Further, the display control unit 110A may execute the display control that causes the additional information supplementing the information provided by the link icon to be displayed, in accordance with the expansion of the rendering region and that enlarges the display sizes of the link icons or additional information.

It is therefore possible to provide appropriate information displaying to the driver who drives the vehicle by expanding the rendering region of the second region (e.g., sub-palette) as needed, while securing normal displaying in the first region (e.g., main palette), causing the additional information supplementing the information provided by the link icons to be displayed, and enlarging the display sizes of the link icons or additional information.

Third Example Embodiment

A vehicle display apparatus 1B according to a third example embodiment of the disclosure will now be described with reference to FIGS. 8 to 11.

Configuration Example of Vehicle Display Apparatus 1B

Figure 8:
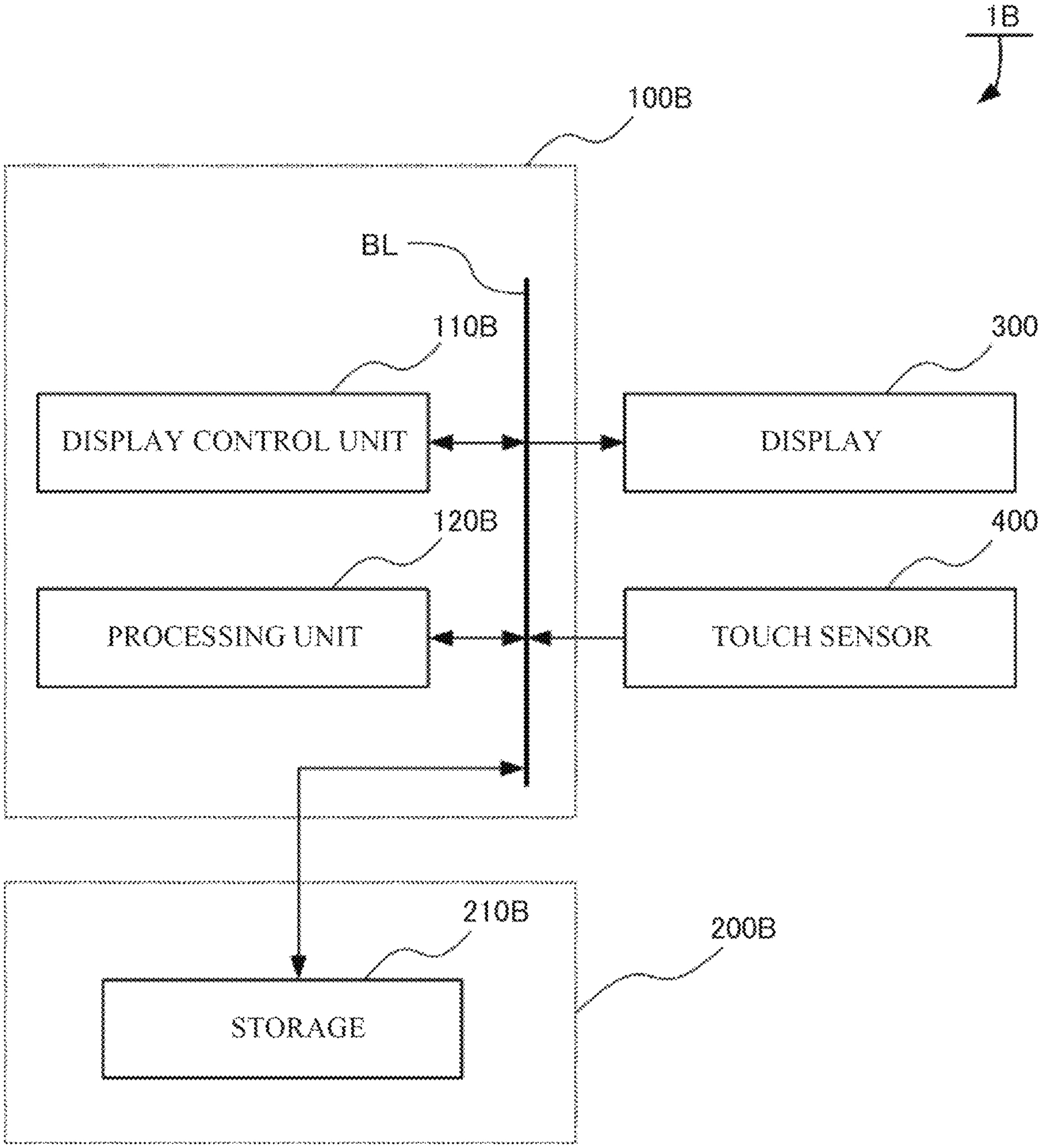
FIG. 8 is a block diagram illustrating a configuration example of a vehicle display apparatus according to one example embodiment of the disclosure.

Referring to FIG. 8, the vehicle display apparatus 1B according to the third example embodiment includes a processor 100B, a memory 200B, a display 300, and a touch sensor 400.

Note that components having the same functionalities as those in the first and second example embodiments are denoted by the same reference numerals to omit detailed description thereof.

The processor 100B may execute various kinds of processing that control a display mode of the display 300, which will be described later, in response to a touch operation made by the occupant of the vehicle on the touch sensor 400, which will be described later.

In the present embodiment, the display 300 includes a first region (e.g., main palette) in which provided content is to be displayed, and a second region (e.g., sub-palette) in which link icons linking to the respective pieces of content are to be displayed. The processor 100B executes display control that causes a display area of the second region to become smaller than a display area of the first region. When the touch sensor 400 detects a swiping operation made by the occupant on any of the link icons displayed on the display 300, the processor 100B executes the display control that expands a rendering region of the second region, based on a completion position of the swiping operation, to or below an upper limit of a range where the display area of the second region is kept smaller than the display area of the first region, while continuing to execute the display control in the first region.

According to the present example embodiment, the processor 100B may further execute display control that causes a setting screen to be displayed in the second region when a functional setting icon is tapped by the occupant after the expansion of the rendering region, for example.

Each of the processes will be described in detail later.

The memory 200B may include a read only memory (ROM) or a random access memory (RAM), and hold and store various programs and various kinds of data.

The memory 200B may include a storage 210B. The storage 210B may hold and store, for example, an upper limit of expansion of the display area of the second region, and display information on the setting screen.

Configuration Example of Processor 100B

Referring to FIG. 8, the processor 100B of the vehicle display apparatus 1B according to the present example embodiment may include a display control unit 110B and a processing unit 120 B.

As illustrated in FIG. 8, devices in the vehicle display apparatus 1B such as the display control unit 110B, the processing unit 120B, the memory 200B, the display 300, and the touch sensor 400 may be coupled to each other via a bus line BL.

The display control unit 110B may control a display mode of the display 300.

In the present example embodiment, the display 300 includes the first region (e.g., main palette) in which the provided content is to be displayed, and the second region (e.g., the sub-palette) in which the link icons linking to the respective pieces of content are to be displayed. The display control unit 110B executes the display control that causes the display area of the second region to become smaller than the display area of the first region. When the touch sensor 400 detects a swiping operation made by the occupant on any of the link icons displayed on the display 300, the display control unit 110B executes the display control that expands the rendering region of the second region, based on the completion position of the swiping operation, to or below the upper limit of the range where the display area of the second region is kept smaller than the display area of the first region, while continuing to execute the display control in the first region.

In the example illustrated in FIG. 2, the occupant may make a swiping operation on any of the link icons displayed on the display 300 illustrated in Part (A) of FIG. 2, as indicated by the arrow in Part (B) of FIG. 2. When such a swiping operation is detected, the display control unit 110B may execute the display control that expands the rendering region of the second region, based on a completion position of the swiping operation made by the occupant, while continuing to execute the display control in the first region, as illustrated in Part (C) of FIG. 2.

In the example illustrated in FIG. 3, the occupant may make a swiping operation on any of the link icons displayed on the display 300 illustrated in Part (A) of FIG. 3, as indicated by the arrow in Part (B) of FIG. 3. When such a swiping operation is detected, the display control unit 110B may execute the display control that expands the rendering region of the second region, based on the completion position of the swiping operation, to or below the upper limit of the range where the display area of the second region is kept smaller than the display area of the first region, while continuing to execute the display control in the first region, as illustrated in Part (C) of FIG. 3.

Figure 9:
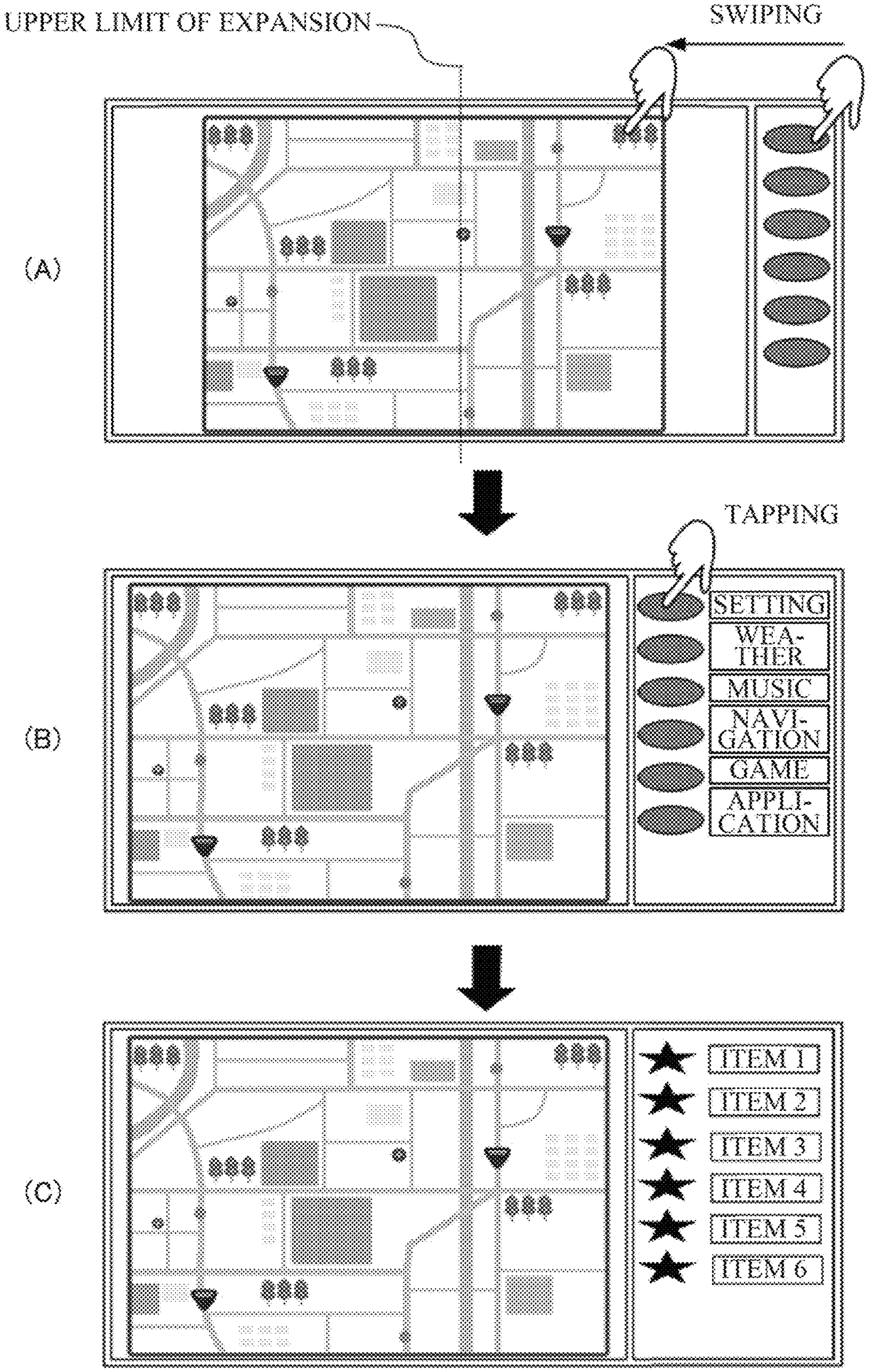
FIG. 9 is a diagram illustrating exemplary display modes in first and second regions of a display of the vehicle display apparatus illustrated in FIG. 8.
Figure 10:
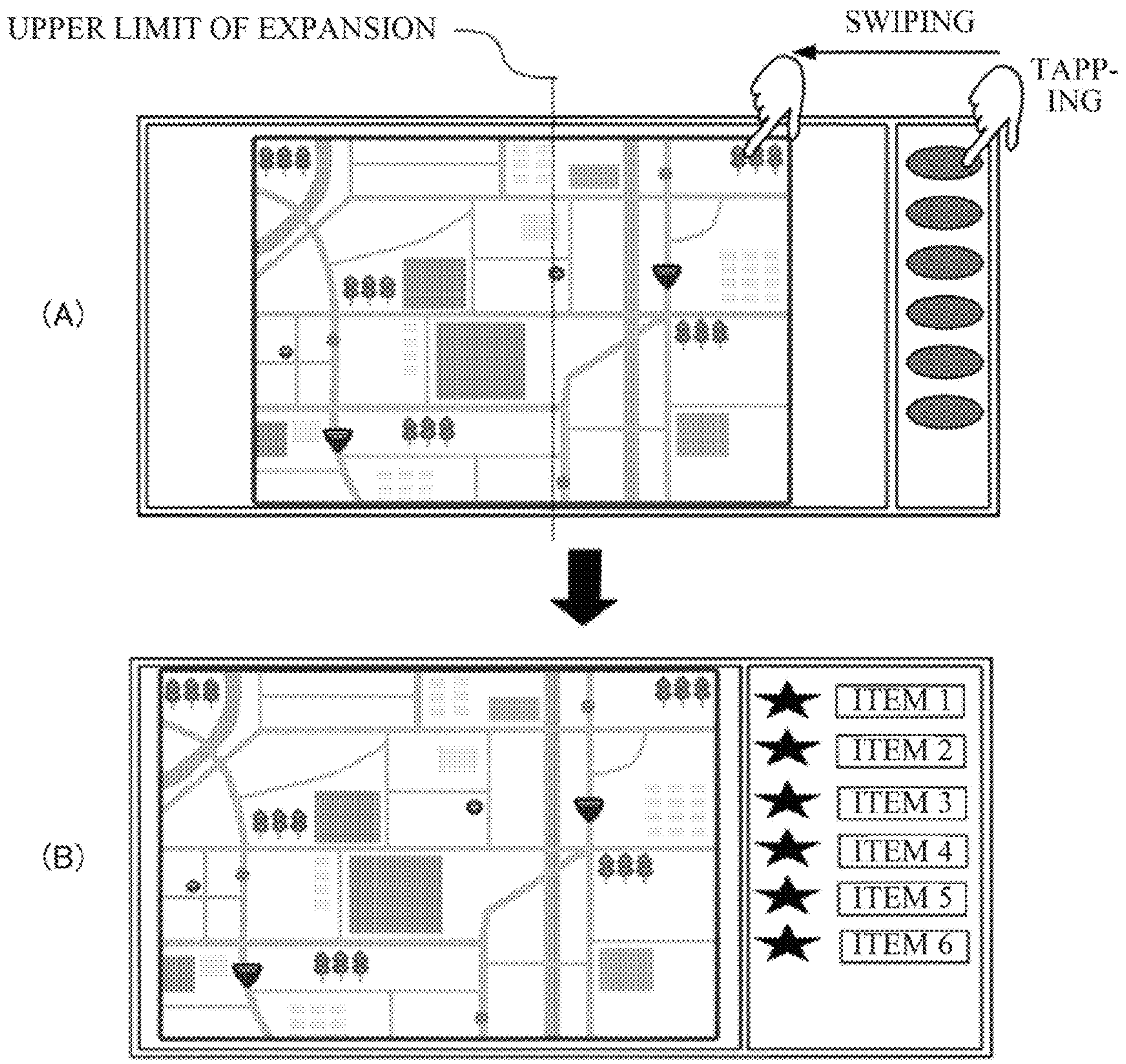
FIG. 10 is a diagram illustrating exemplary display modes in the first and second regions of the display of the vehicle display apparatus illustrated in FIG. 8.

In an example illustrated in FIG. 9, after expanding the rendering region as indicated by an arrow in Part (A) of FIG. 9, the occupant may tap the functional setting icon, as illustrated in Part (B) of FIG. 9. When the functional setting icon is tapped by the occupant, the display control unit 110B may execute the display control that causes the setting screen including “Item 1” to “Item 6” to be displayed in the second region, as illustrated in Part (C) of FIG. 9. In an example illustrated in FIG. 10, the occupant may tap a setting button at the start of a swiping operation, and then make a swiping operation, as indicated by an arrow in Part (A) of FIG. 10. When the setting button is tapped by the occupant, the display control unit 110B may execute the display control that causes the setting screen including “Item 1” to “Item 6” to be displayed in the second region, in accordance with the expansion of the rendering region, as illustrated in Part (B) of FIG. 10.

The control by the display control unit 110B may be executed based on sensor output data transmitted from the touch sensor 400 to the processing unit 120B, which will be described later, via the bus line BL.

The processing unit 120B may control an overall operation of the vehicle display apparatus 1B, based on a control program stored in ROM in the storage 210B, for example.

In some embodiments, the processing unit 120B may cause the touch sensor 400 to transmit the sensor output data and cause the display control unit 110B to execute the display control. In some embodiments, the processing unit 120B may transmit the sensor output data received from the touch sensor 400 to the display control unit 110B via the bus line BL, thereby causing the display control unit 110B to cause the setting screen to be displayed in the second region when the functional setting icon is tapped by the occupant after the expansion of the rendering region.

In some embodiments, the processing unit 120B may transmit the sensor output data received from the touch sensor 400 to the display control unit 110B via the bus line BL. When the occupant taps the setting button at the start of the swiping operation and then make the swiping operation, the processing unit 120B may cause the display control unit 110B to execute the display control that causes the setting screen to be displayed in the second region in accordance with the expansion of the rendering region.

<Exemplary Processing by Vehicle Display Apparatus 1B>

Figure 11:
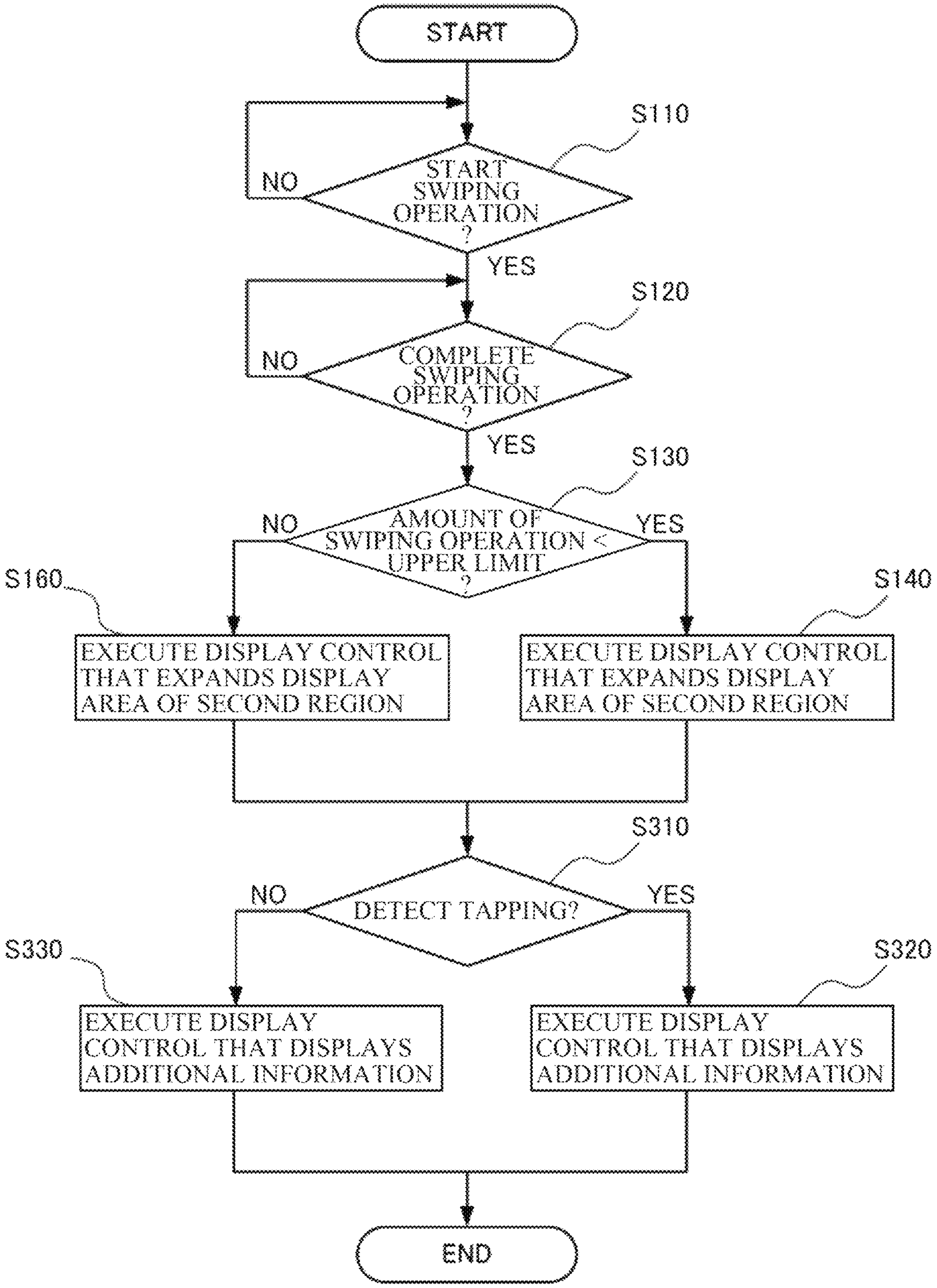
FIG. 11 is a flowchart of exemplary processing to be performed by the vehicle display apparatus illustrated in FIG. 8.

Exemplary processing to be performed by the vehicle display apparatus 1B according to the present example embodiment will now be described with reference to FIG. 11.

In Step S110, the processing unit 120B may determine whether the occupant has started making the swiping operation, based on the sensor output data received from the touch sensor 400.

If determining, based on the sensor output data received from the touch sensor 400, that the occupant has not started making the swiping operation (Step S110: NO), the processing unit 120B may cause the processing to shift to a stand-by mode.

If determining, based on the sensor output data received from the touch sensor 400, that the occupant has started making the swiping operation (Step S110: YES), the processing unit 120B may cause the processing to proceed to Step S120.

In Step S120, the processing unit 120B may determine whether the occupant has completed the swiping operation, based on the sensor output data received from the touch sensor 400 (Step S120).

If determining, based on the sensor output data received from the touch sensor 400, that the occupant has not completed the swiping operation (Step S120: NO), the processing unit 120B may cause the processing to shift to the stand-by mode.

If determining, based on the sensor output data received from the touch sensor 400, that the occupant has completed the swiping operation (Step S120: YES), the processing unit 120B may cause the processing to proceed to Step S130.

In Step S130, the processing unit 120B may determine whether the amount of swiping operation made by the occupant is less than the predetermined upper limit, based on the sensor output data received from the touch sensor 400.

If determining, based on the sensor output data received from the touch sensor 400, that the amount of swiping operation made by the occupant is less than the predetermined upper limit (Step S130: YES), the processing unit 120B may execute, in Step S140, the display control that expands the rendering region of the second region, based on the amount of swiping operation made by the occupant, while continuing to execute the display control in the first region.

After the expansion of the rendering region, the processing unit 120B may determine in Step S310 whether the occupant has tapped the functional setting icon.

If determining that the occupant has tapped the functional setting icon after the expansion of the rendering region (Step S310: YES), the processing unit 120B may cause the display control unit 110B to display the setting screen in the second region, while continuing to execute the display control in the first region in Step S320. Thereafter, the processing may end.

If determining, based on the sensor output data received from the touch sensor 400, that the amount of swiping operation made by the occupant is not less than the predetermined upper limit (Step S130: NO), the processing unit 120B may execute, in Step S160, the display control that expands the rendering region of the second region, based on the predetermined upper limit, while continuing to execute the display control in the first region. Note that the predetermined upper limit may be set to such a value that the display area of the second region is kept smaller than the display area of the first region.

If determining that the occupant has not tapped the functional setting icon after the expansion of the rendering region (Step S310: NO), the processing unit 120B may cause, in Step S330, the display control unit 110B to execute the display control that causes the additional information supplementing the information provided by the link icon to be displayed in the second region, in accordance with the expansion of the rendering region, while continuing to execute the display control in the first region even after the expansion of the rendering region. Thereafter, the processing may end.

<Workings and Effects>

As described above, the vehicle display apparatus 1B according to the present example embodiment includes the display 300, the touch sensor 400, the display control unit 110B, and the storage 210B. The display 300 may display the information including the image information and the text information. The touch sensor 400 may detect contact between the occupant and the display 300. The display control unit 110B controls the display mode of the display 300. The storage 210B holds the information including the information on the display mode of the display 300. The display 300 includes the first region in which the provided content is to be displayed, and the second region in which the link icons linking to the respective pieces of content are to be displayed. The display control unit 110B executes the display control that causes the display area of the second region to become smaller than the display area of the first region. When the touch sensor 400 detects the swiping operation made by the occupant on any of the link icons displayed on the display 300, the display control unit 110B executes the display control that expands the rendering region of the second region, based on the completion position of the swiping operation, to or below the upper limit of the range where the display area of the second region is kept smaller than the display area of the first region, while continuing to execute the display control in the first region. When the occupant has tapped the functional setting icon after the expansion of the rendering region, the display control unit 110B may execute the display control that cause the setting screen to be displayed in the second region.

That is, the display control unit 110B executes the display control that causes the display area of the second region to become smaller than the display area of the first region. When the touch sensor 400 detects the swiping operation made by the occupant on the link icon displayed on the display 300, the display control unit 110B executes the display control that expands the rendering region of the second region, to or below the upper limit of the range where the display area of the second region is kept smaller than the display area of the first region, based on the completion position of the swiping operation, while continuing to execute the display control in the first region. Further, when the occupant has tapped the functional setting icon after the expansion of the rendering region, the display control unit 110B may execute the display control that causes the setting screen to be displayed in the second region.

It is therefore possible to provide appropriate information displaying to the driver who drives the vehicle by expanding the rendering region of the second region (e.g., sub-palette) as needed and displaying the setting screen in the second region, while securing normal displaying in the first region (e.g., main palette).

Modification Example 1

In the first to third example embodiments described above, the display control that expands the rendering region of the second region is executed based on the completion position of the swiping operation made by the occupant. However, according to Modification Example 1, the display control that expands the rendering region of the second region may be executed based on the completion position of the swiping operation made by the occupant, when the occupant makes a tapping operation after the completion of the swiping operation.

Executing the display control in this manner makes it possible to prevent the occupant from making an erroneous swiping operation.

Modification Example 2

In the first to third example embodiments described above, the display control that expands the rendering region of the second region is executed based on the completion position of the swiping operation made by the occupant. However, according to Modification Example 2, the rendering region of the second region may be restored to an original size when the amount of swiping operation made by the occupant is less than a predetermined operation amount.

When the amount of swiping operation made by the occupant is less than the predetermined operation amount, it is difficult to display the additional information supplementing the information provided by the link icon, or although it is possible to display the additional information, the text size can be too small to read.

To address this concern, according to Modification Example 2, when the amount of swiping operation made by the occupant is less than the predetermined operation amount, the rendering region of the second region may be restored to the original size, and a text message or a sound massage may be issued to urge the occupant to increase the amount of swiping operation.

In some embodiments, it is possible to implement the vehicle display apparatus 1, 1A, or 1B of any of the example embodiments of the disclosure by recording the process to be executed by the processor 100, 100A, or 100B on a non-transitory recording medium readable by a computer system, and causing the computer system to load the program recorded on the non-transitory recording medium onto the processor 100, 100A, or 100B to execute the program. The computer system as used herein may encompass an operating system (OS) and a hardware such as a peripheral device.

In addition, when the computer system utilizes a World Wide Web (WWW) system, the "computer system" may encompass a website providing environment (or a website displaying environment). The program may be transmitted from a computer system that contains the program in a storage device or the like to another computer system via a transmission medium or by a carrier wave in a transmission medium. The "transmission medium" that transmits the program may refer to a medium having a capability to transmit data, including a network (e.g., a communication network) such as the Internet and a communication link (e.g., a communication line) such as a telephone line.

Further, the program may be directed to implement a part of the operation described above. The program may be a so-called differential file (differential program) configured to implement the operation by a combination of a program already recorded on the computer system.

Although some embodiments of the disclosure have been described in detail with reference to the accompanying drawings, all the vehicle display apparatuses implementable through modifications appropriately made by those skilled in the art based on the vehicle display apparatus according to the foregoing example embodiments of the disclosure also fall within the technical scope of the disclosure as long as they include the gist of the disclosure.

Within the scope of the idea of the disclosure, those skilled in the art can conceive of various modifications and alterations, and it is understood that these modifications and alterations also fall within the technical scope of the present invention.

For example, those skilled in the art may add some constituent elements to or delete some constituent elements from the foregoing example embodiments, as appropriate, or add some steps to or remove some steps from the foregoing example embodiment, as appropriate. These embodiments are also included in the technical scope of the disclosure as long as they include the gist of the disclosure.

Further, it will be understood that other effects than those provided by the foregoing example embodiments and apparent from the description herein or appropriately conceivable by those skilled in the art are naturally provided by the disclosure.

Various aspects of the disclosure may be provided by appropriately combining the constituent elements disclosed in the foregoing example embodiments.

For example, some components may be deleted from all the components disclosed in the foregoing example embodiments.

Furthermore, components across different embodiments may be combined as appropriate.

The limitations in the claims are to be interpreted broadly based on the language employed in the claims and not limited to examples described in this specification or during the prosecution of the application, and the examples are to be construed as non-exclusive.

As used in this specification and the appended claims, the singular forms "a", "an", and "the" include, especially in the context of the claims, are to be construed to cover both the singular and the plural, unless otherwise indicated herein or clearly contradicted by context.

Throughout this specification and the appended claims, unless the context requires otherwise, the terms "comprise", "include", "have", and their variations are to be construed to cover the inclusion of a stated element, integer, or step but not the exclusion of any other non-stated element, integer, or step.

The use of the terms first, second, etc. do not denote any order or importance, but rather the terms first, second, etc. are used to distinguish one element from another.

The term "disposed on/provided on/formed on" and its variants having the similar meaning thereto as used herein refer to elements disposed directly in contact with each other or indirectly by having intervening structures therebetween.

One or both of the display control unit 110 and the processing unit 120 illustrated in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the display control unit 110 and the processing unit 120 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the display control unit 110 and the processing unit 120 illustrated in FIG. 1.

The invention claimed is:

1. A display apparatus for a vehicle, the display apparatus comprising:

a display comprising a first region in which content is to be displayed and a second region in which a link icon linking to the content is to be displayed;

a touch sensor;

a display control unit configured to execute display control that controls a display mode of the display; and a storage configured to store an upper limit of expansion of a display area of the second region and data on the display mode of the display, wherein the display control unit is configured to:

execute the display control to cause a display area of the second region to be smaller than a display area of the first region;

determine, based on sensor output data from the touch sensor, whether an occupant of the vehicle has started making a swiping operation on the link icon displayed in the second region;

determine, based on the sensor output data from the touch sensor, whether the occupant has completed the swiping operation;

determine, after determining that the occupant has completed the swiping operation, an amount of expansion of a rendering region of the second region based on a completion position of the swiping operation;

determine whether the amount of expansion is less than the upper limit of expansion;

in response to determining that the amount of expansion is less than the upper limit of expansion, execute the display control to expand the rendering region of the second region based on the amount of expansion, while the content continues to be displayed in the first region, and the display area of the second region is kept smaller than the display area of the first region; and in response to determining that the amount of expansion is not less than the upper limit of expansion, execute the display control to expand the rendering region of the second region based on the upper limit of expansion, while the content continues to be displayed in the first region, and the display area of the second region is kept smaller than the display area of the first region, wherein the upper limit of expansion is set to such a value that the display area of the second region is kept smaller than the display area of the first region after the rendering region of the second region is expanded, and wherein the display control unit is further configured to cause additional information supplementing information indicating the content to be displayed in the second region in accordance with the expansion of the rendering region of the second region.

2. The display apparatus according to claim 1, wherein the display control unit is configured to enlarge a display size of one or both of the link icon and the additional information in accordance with the expansion of the rendering region of the second region.

3. The display apparatus according to claim 1, wherein the link icon is a functionality setting icon, and the display control unit is configured to cause a setting screen to be displayed in the second region when the functionality setting icon is tapped by the occupant after the rendering region of the second region is expanded.

4. The display apparatus according to claim 1, wherein the display control unit is configured to expand the rendering region of the second region based on the completion position of the swiping operation when the occupant makes a tapping operation after completion of the swiping operation.

5. The display apparatus according to claim 1, wherein, when the amount of the swiping operation is less than a predetermined operation amount, the display control unit is configured to:

restore the rendering region of the second region to an original size; and issue a text message or a sound message urging the occupant to increase the amount of the swiping operation.

6. A display apparatus for a vehicle, the display apparatus comprising:

a display comprising a first region in which content is to be displayed and a second region in which a link icon linking to the content is to be displayed;

a touch sensor;

one or more processors configured to execute display control that controls a display mode of the display; and one or more memories communicably coupled to the one or more processors and configured to store an upper limit of expansion of a display area of the second region and data on the display mode of the display, wherein the one or more processors are configured to:

execute the display control to cause a display area of the second region to be smaller than a display area of the first region;

determine, based on sensor output data from the touch sensor, whether an occupant of the vehicle has started making a swiping operation on the link icon displayed in the second region;

determine, based on the sensor output data from the touch sensor, whether the occupant has completed the swiping operation;

determine, after determining that the occupant has completed the swiping operation, an amount of expansion of a rendering region of the second region based on a completion position of the swiping operation;

determine whether the amount of expansion is less than the upper limit of expansion;

in response to determining that the amount of expansion is less than the upper limit of expansion, execute the display control to expand the rendering region of the second region based on the amount of expansion, while the content continues to be displayed in the first region, and the display area of the second region is kept smaller than the display area of the first region; and in response to determining that the amount of expansion is not less than the upper limit of expansion, execute the display control to expand the rendering region of the second region based on the upper limit of expansion, while the content continues to be displayed in the first region, and the display area of the second region is kept smaller than the display area of the first region, wherein the upper limit of expansion is set to such a value that the display area of the second region is kept smaller than the display area of the first region after the rendering region of the second region is expanded, and wherein the one or more processors are further configured to cause additional information supplementing information indicating the content to be displayed in the second region in accordance with the expansion of the rendering region of the second region.

* * * * *